(12) United States Patent
Villarreal

(10) Patent No.: US 10,895,348 B2
(45) Date of Patent: Jan. 19, 2021

(54) INTEGRATED COMPOSITE MOUNTING STRUCTURE FOR USE IN PRESSURE VESSELS AND PRESSURE VESSEL SYSTEMS

(71) Applicant: Cleanng LLC, Tulsa, OK (US)

(72) Inventor: R. Matt Villarreal, Bixby, OK (US)

(73) Assignee: CLEANNG, LLC, Tulsa, OK (US)

( * ) Notice: Subject to any disclaimer, the term of this patent is extended or adjusted under 35 U.S.C. 154(b) by 295 days.

(21) Appl. No.: 16/066,982

(22) PCT Filed: Jan. 3, 2017

(86) PCT No.: PCT/US2017/012039
§ 371 (c)(1),
(2) Date: Jun. 28, 2018

(87) PCT Pub. No.: WO2017/117603
PCT Pub. Date: Jul. 6, 2017

(65) Prior Publication Data
US 2019/0024848 A1    Jan. 24, 2019

Related U.S. Application Data

(60) Provisional application No. 62/273,591, filed on Dec. 31, 2015.

(51) Int. Cl.
*F17C 13/08* (2006.01)
*F17C 1/16* (2006.01)
*F17C 1/00* (2006.01)

(52) U.S. Cl.
CPC .............. *F17C 13/083* (2013.01); *F17C 1/00* (2013.01); *F17C 1/16* (2013.01);
(Continued)

(58) Field of Classification Search
CPC ........ F17C 2203/067; F17C 2205/0115; F17C 2205/0107; F17C 2205/0103;
(Continued)

(56) References Cited

U.S. PATENT DOCUMENTS 2,109,529 A * 3/1938 Goddard ................... F17C 1/06
244/117 R
2,685,979 A * 8/1954 Zeek ......................... F17C 1/06
220/588

(Continued)

FOREIGN PATENT DOCUMENTS

EP    2470244 A2    4/2015

*Primary Examiner* — Fenn C Mathew
*Assistant Examiner* — Jennifer Castriotta
(74) *Attorney, Agent, or Firm* — Gable Gotwals

(57) ABSTRACT

A pressure vessel mounting structure (10) includes a plurality of bands (11) made of a composite material cured about the exterior surface (35) of the pressure vessel (30) to form an integral part of the vessel. The bands (11) may be spaced apart from one another to form a crisscrossing helical grid pattern with opposing ends (21) of the bands extending past a respective end (31) of the pressure vessel (30) and toward a longitudinal centreline (33) of the pressure vessel (30) to form a skirt (17). The skirt (17) provides mounting mounts (15) as well as a vertical standing mount for the vessel.

9 Claims, 2 Drawing Sheets

(52) U.S. Cl.
CPC .. *F17C 2203/066* (2013.01); *F17C 2203/067* (2013.01); *F17C 2205/0103* (2013.01); *F17C 2205/0107* (2013.01); *F17C 2205/018* (2013.01); *F17C 2205/0115* (2013.01); *F17C 2205/0126* (2013.01); *F17C 2205/0153* (2013.01); *F17C 2205/0192* (2013.01); *F17C 2205/0196* (2013.01); *F17C 2270/0168* (2013.01)

(58) Field of Classification Search
CPC ........ F17C 2205/018; F17C 2205/0192; F17C 2205/0196; F17C 2205/0153; F17C 2270/0168; F17C 2270/0171; F17C 2270/0173; F17C 2270/0176; F17C 2270/0178; F17C 2270/0165
USPC .... 220/592, 23.87, 581, 648, 649, 646, 633, 220/634; 206/592
See application file for complete search history.

(56) References Cited

U.S. PATENT DOCUMENTS

| | | | |
|---|---|---|---|
| 4,967,923 A * | 11/1990 | Wren | F17C 13/06 137/382 |
| 8,932,695 B1 | 1/2015 | Villareal et al. | |
| 2003/0047178 A1 * | 3/2003 | Barth | A47J 37/0786 126/41 R |
| 2004/0026437 A1 * | 2/2004 | Hembert | F17C 13/123 220/630 |
| 2005/0180677 A1 | 8/2005 | Andrews et al. | |
| 2010/0276434 A1 | 11/2010 | Berger et al. | |

\* cited by examiner

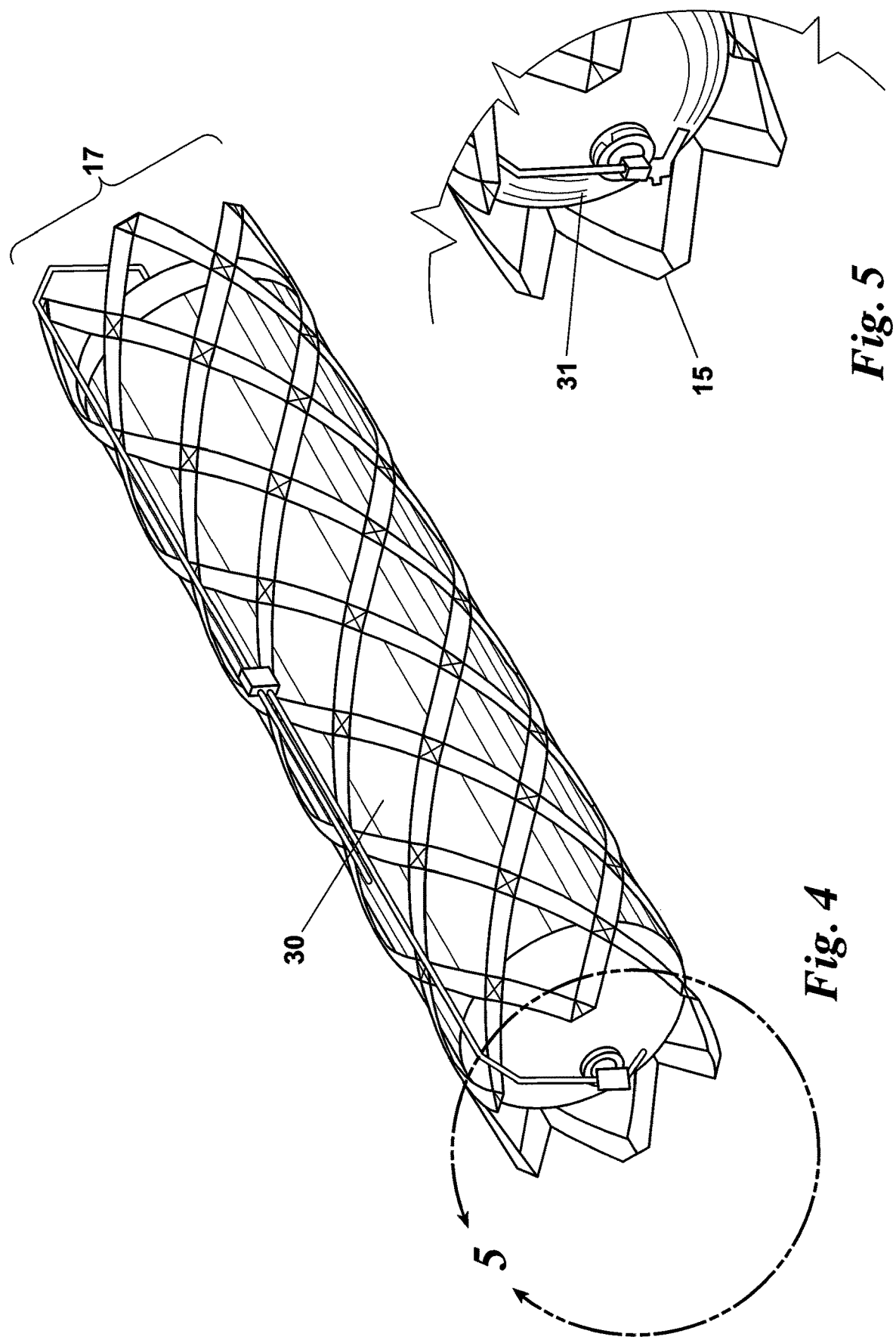

INTEGRATED COMPOSITE MOUNTING STRUCTURE FOR USE IN PRESSURE VESSELS AND PRESSURE VESSEL SYSTEMS

CROSS-REFERENCE TO RELATED APPLICATIONS

This application is the United States National Phase of Patent Application No. PCT/US2017/012039 filed 3 Jan. 2017, U.S. Patent Application No. 62/273,591filed 31 Dec. 2015, each of which are incorporated herein by reference.

BACKGROUND

This invention relates to systems and methods used to mount pressure vessels to a vehicle or within a system used to transport fuels or gases.

More than 90% of high pressure storage vessels use metal designs which are monolithic in nature so they can be mounted, without risk of damage to the vessels, within a system or to a vehicle using metal straps or neck mounts. The mounts typically include (1) at least two sets of two-part metal straps clamped onto a cylindrical section of the vessel and bolted together, the straps then bolted to rails running horizontal to the axis of the vessel and (2) two sets of two-part machined blocks (boss mount) which are clamped down onto the neck of the vessel and bolted together, the blocks then bolted to rails running perpendicular to the axis of the vessel. These metal strap and neck mounts can be rapidly stamped out or CNC machined for high volume and low cost.

However, within the last 20 years all composite pressure vessels have come into use. The prior art mounts cause damage, degradation and potential failure to the composite vessel from factors such as torsion on the boss (boss mount) and pressure cycling that causes vibration, rubbing of the straps against the vessel, and abrasion to the vessel. Neck mounting systems are problematic because they exert forces directly on the neck of all composite vessels which can cause a break in the boss shell interface and render a vessel obsolete. These neck mounted systems are also costly and do not provide any additional function or value to the vessel.

These systems and methods are also difficult to handle and install due to their multicomponent design and the added weight of the mounting brackets. Additionally, the systems and methods only serve the singular purpose of fixing the vessels to rails whereas the disclosed invention provides protection from drops and impact from all directions.

SUMMARY

Preferred embodiments of a mounting structure made according to this invention are useful in applications where bulk quantities of gases or liquids need to be stored or transported and in over-the-road or marine transport applications as well as aviation and aerospace applications.

The mounting structure includes a plurality of alternating bands wrapped about the pressure vessel in a spaced-apart helical grid pattern. The structure, which is cured to form an integral part of the vessel's exterior, extends past the domed ends of the vessel and tapers past these ends toward the vessel's central longitudinal axis (or axis of rotation) to form a skirt. A plurality of mounting points are provided which can accommodate various shapes of mounting hardware.

Objectives of the invention include providing a mounting structure that (1) forms an integral part of the exterior surface of a composite pressure vessel; (2) increases safety; (3) serves as a protective structure in case of impact, fire, drop, or chemical attack; (4) simplifies the installation of vessels into a system and decreases installation time; (5) does not add a significant amount of weight or width to the vessel compared to prior art strap-mounted or neck-mounted systems; and (6) eliminates or reduces the need for metal straps that can damage the external layers of the composite pressure vessel.

BRIEF DESCRIPTION OF THE DRAWINGS

FIG. 4 is an isometric view of the mounting structure of FIG. 1.
FIG. 5 is a detail view taken along section 5 of FIG. 4.

ELEMENTS AND NUMBERING USED IN THE DRAWINGS AND DETAILED DESCRIPTION

Figure 1:
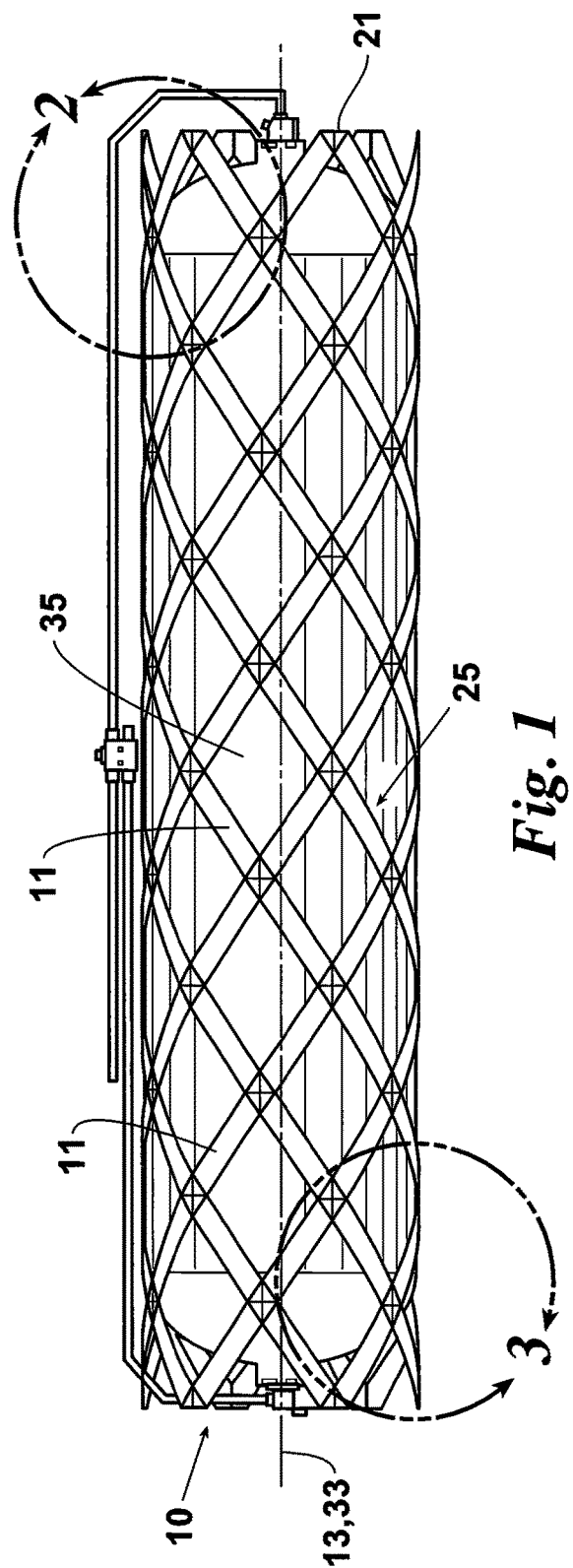
FIG. 1 is a front elevation view of a preferred embodiment of the mounting structure formed and cured about an exterior of a composite pressure vessel.

10 Mounting structure
11 Bands or ribs
13 Central longitudinal axis
15 Mounting points
17 Skirt
21 End
25 Helical grid pattern
30 Composite, cylindrical pressure vessel or pressure vessel
31 End or dome
33 Central longitudinal axis or axis of rotation
35 Exterior surface or body

DETAILED DESCRIPTION OF THE PREFERRED EMBODIMENTS

Preferred embodiments of a mounting device or structure is integral to a high-pressure vessel and can be used to mount the vessel within a system for transporting fuels or gases or to a vehicle. Some embodiments provide systems and methods for producing a tubular helical ribbed architecture which is integrated into the exterior body of a composite pressure vessel and includes a continuous plurality of fibers impregnated with resin matrix which are wound under tension onto the pressure vessel forming helical composite ribs which extend the length of the vessel, protrude past the cylindrical portion of the vessel and taper past the dome ends toward the central longitudinal axis of the vessel.

Figure 2:
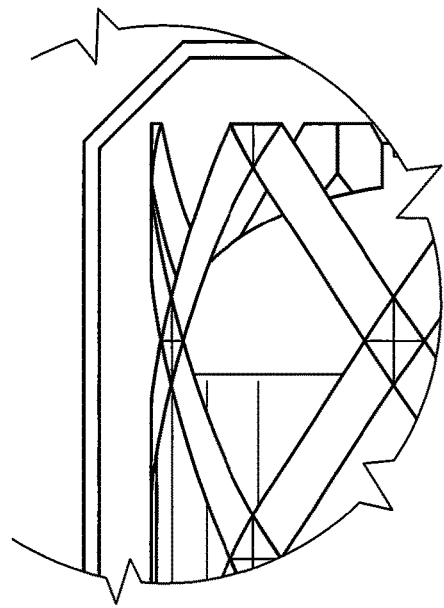
FIG. 2 is a detail view taken along section 2 of FIG. 1.
Figure 3:
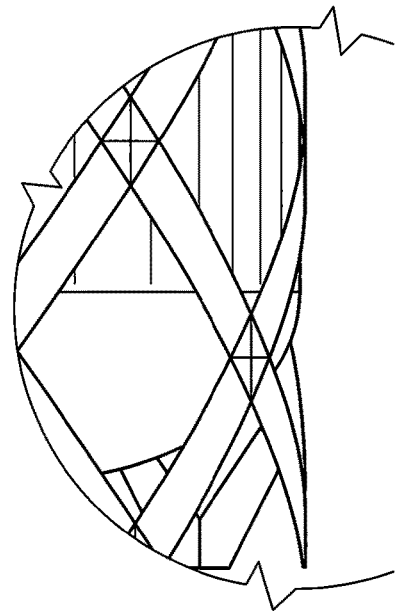
FIG. 3 is a detail view taken along section 3 of FIG. 1.

Referring now to FIGS. 1 to 5, a preferred embodiment of the mounting structure 10 is made of a plurality of bands or ribs 11 of continuous tow polymer resin-impregnated fibers wrapped about a pressure vessel 30 in a spaced-apart intersecting or crisscrossing helical (grid) pattern 25. On each end of the vessel 30 the ribs 11 extend past the ends or dome 31 of the vessel 30, with the mounting structure 10 tapered towards the central longitudinal axis or axis of rotation 33 of the vessel (and therefore the central longitudinal axis 13 of the mounting structure 10). In this way, each end 23 of the mounting structure 10 is smaller in diameter than that of the vessel 30 and forms an open end that effectively traps the vessel 10.

The mounting structure 10 is manufactured by filament-winding continuous tows of polymer resin-impregnated fibers around the vessel 30 in an alternating, banded helical wrapping pattern. The vessel 30 is then placed into an oven to cure so the mounting structure 10 becomes integrated into the exterior surface or body 35 of the vessel 30 rather than being a separate structure apart from the vessel 30. Alternatively, the vessel 30 may be cured first with the mounting structure 10 then added and cured to become an integral part of the vessel 30.

Unlike strap-mounted systems, structure 10 forms an integral part of the exterior surface 35 of the vessel 30 and cannot move relative to the vessel 30 or loosen during transport or use. The mounting structure 10 eliminates the need for the prior art two-part metal strap mounting arrangement. The structure 10 also is not neck-mounted, nor does it require the kind of mounting brackets associated with the prior art neck mount.

Once the structure 10 is cured, mounting hardware (not shown) can be installed on mounting points 15 formed by the bands 11 or intersection of the bands 11. The ends 21 may serve as a skirt 17 to enable vertical standing mounts (because the length of the structure 10 is greater than that of the vessel 30). The structure 10 itself protects the vessel 30 from drops and impacts.

The mounting hardware can be any shape preferable—including but not limited to circle, square, hexagonal—depending on the system the vessel 30 is being mounted within. A preferred pressure vessel 30 is composite pressure vessels manufactured by Infinite Composites Technologies (Houston and Tulsa) or their equivalent.

What is claimed is:

1. A composite pressure vessel [30] comprising:
a vessel mounting structures [10] including a plurality of bands [11] made of a composite material to form a helical grid pattern [25] about, and bonded to, an exterior surface [35] of the composite pressure vessel
the helical grid pattern extending past each closed end [31] of the composite pressure vessel to form a skirt [17], the skirt not coming into contact with the exterior surface of the composite pressure vessel.

2. A composite pressure vessel according to claim 1 further comprising the composite material including continuous tow resin-impregnated fibers.

3. A composite pressure vessel according to claim 1 further comprising, the plurality of bands being integral to the exterior surface of the composite pressure vessel.

4. A composite pressure vessel according to claim 1 further comprising the helical grid pattern forming mounting points [15] in the skirt, arranged to receive mounting hardware.

5. A composite pressure vessel according to claim 4 further comprising at least one of the mounting points being located at an intersection of two bands of the plurality of bands.

6. A composite pressure vessel according to claim 1 further comprising the skirt [17] forming an open end [21] having diameter less than that of an opposing closed end [31] of the composite pressure vessel.

7. A composite pressure vessel [30] comprising:
a vessel mounting structure including a plurality of bands [11] made of a composite material to form a helical grid pattern [25] about, and bonded to, an exterior surface [35] of the composite pressure vessel,
the helical grid pattern extending past each closed end [31] of the composite pressure vessel to form a skirt [17], the skirt not coming into contact with the exterior surface of the composite pressure vessel,
the skirt including an open end [21] having a diameter less than that of the composite pressure vessel.

8. A composite pressure vessel according to claim 7 further comprising the helical grid pattern forming mounting points [15] in the skirt, arranged to receive mounting hardware.

9. A composite pressure vessel [30] comprising a vessel mounting structure including a plurality of bands [11] made of a composite material to form a helical grid pattern about, and bonded to, an exterior surface [35] of the composite pressure vessel
the helical grid pattern extending past each closed end [31] of the composite pressure vessel to form a skirt [17] containing hardware mounting points [15] located at intersecting bands of the helical grid pattern, the skirt not coming into contact with the exterior surface of the composite pressure vessel,
the skirt including an open end [21] having a diameter less than that of the composite pressure vessel.

* * * * *